(12) United States Patent  (10) Patent No.: US 8,955,552 B2
Nanney et al.  (45) Date of Patent: Feb. 17, 2015

(54) FIRE RESISTANT HOSE ASSEMBLY

(75) Inventors: Shadrach Nanney, Mansfield, TX (US); Nagarajan Ramaswamy, Fort Worth, TX (US); Peter J. Stroempl, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 603 days.

(21) Appl. No.: 13/386,678

(22) PCT Filed: Jul. 16, 2010

(86) PCT No.: PCT/US2010/042216
§ 371 (c)(1),
(2), (4) Date: Jan. 24, 2012

(87) PCT Pub. No.: WO2011/011268
PCT Pub. Date: Jan. 27, 2011

(65) Prior Publication Data
US 2012/0125470 A1    May 24, 2012

Related U.S. Application Data

(60) Provisional application No. 61/228,281, filed on Jul. 24, 2009.

(51) Int. Cl.
*F16L 11/00* (2006.01)
*F16L 11/08* (2006.01)

(52) U.S. Cl.
CPC .................................. *F16L 11/087* (2013.01)
USPC ........... 138/125; 138/149; 138/137; 138/124; 428/36.91; 428/36.1

(58) Field of Classification Search
USPC ................. 138/137, 140, 123–126, 144, 149; 148/36.91, 36.1
See application file for complete search history.

(56) References Cited

U.S. PATENT DOCUMENTS 1,630,895 A    5/1927    Herbst
3,251,612 A    7/1966    Webbe
(Continued)

FOREIGN PATENT DOCUMENTS

GB    2 184 512 A    6/1987
JP    06159573 A    6/1994
(Continued)

OTHER PUBLICATIONS

International Search Report and the Written Opinion for corresponding International Application No. PCT/US2010/042216 mailed Oct. 12, 2010.
(Continued)

*Primary Examiner* — Patrick F Brinson
(74) *Attorney, Agent, or Firm* — Renner, Otto, Boisselle & Sklar, LLP (57) ABSTRACT

A fire resistant flexible hose construction particularly adapted for aerospace applications includes a tubular core, a reinforcement layer surrounding the exterior surface of the tubular core, a thermal insulation layer surrounding reinforcement layer, and an integral firesleeve layer surrounding the thermal insulation layer. The reinforcement layer includes one or more filaments of one or more fibers, such as aramid fibers. The thermal insulation layer is constructed of one or more filaments of e-glass.

19 Claims, 4 Drawing Sheets

(56) References Cited

U.S. PATENT DOCUMENTS

| | | | |
|---|---|---|---|
| 3,540,488 A | 11/1970 | Voorhees | |
| 3,552,445 A | 1/1971 | Andrews | |
| 3,905,398 A | 9/1975 | Johansen et al. | |
| 3,913,625 A | 10/1975 | Gazda et al. | |
| 4,159,027 A | 6/1979 | Caillet | |
| 4,259,989 A * | 4/1981 | Lalikos et al. | 138/109 |
| 4,271,218 A | 6/1981 | Heckel et al. | |
| 4,275,769 A | 6/1981 | Cooke | |
| 4,303,457 A | 12/1981 | Johansen et al. | |
| 4,307,756 A | 12/1981 | Voigt et al. | |
| 4,384,595 A | 5/1983 | Washkewicz et al. | |
| 4,488,577 A | 12/1984 | Shilad et al. | |
| 4,509,559 A | 4/1985 | Cheetham et al. | |
| 4,898,212 A | 2/1990 | Searfoss et al. | |
| 4,942,903 A | 7/1990 | Jacobsen | |
| 4,989,643 A | 2/1991 | Walton et al. | |
| 5,183,079 A * | 2/1993 | Blin | 138/110 |
| 5,361,806 A | 11/1994 | Lalikos et al. | |
| 5,489,126 A | 2/1996 | Gray, Jr. | |
| 5,638,869 A | 6/1997 | Zaborszki et al. | |
| 5,988,226 A | 11/1999 | Matthews | |
| 6,003,561 A * | 12/1999 | Brindza et al. | 138/124 |
| 6,334,466 B1 | 1/2002 | Jani et al. | |
| 6,494,497 B1 | 12/2002 | Kertesz | |
| 6,508,806 B1 | 1/2003 | Hoste | |
| 6,807,988 B2 | 10/2004 | Powell et al. | |
| 6,948,528 B2 * | 9/2005 | Martucci et al. | 138/121 |
| 7,588,057 B2 | 9/2009 | Bentley | |
| 8,689,838 B2 * | 4/2014 | Stroempl et al. | 138/149 |
| 2004/0121152 A1 * | 6/2004 | Toas | 428/374 |
| 2006/0151043 A1 | 7/2006 | Nanney et al. | |
| 2006/0201570 A1 | 9/2006 | Lord et al. | |
| 2007/0014995 A1 * | 1/2007 | Chacko et al. | 428/430 |
| 2008/0185063 A1 | 8/2008 | Bieszczad et al. | |
| 2008/0190506 A1 | 8/2008 | Cleveland | |
| 2008/0210329 A1 | 9/2008 | Quigley et al. | |

FOREIGN PATENT DOCUMENTS

| | | |
|---|---|---|
| JP | 2004197915 A | 7/2004 |
| WO | 99/11962 A1 | 3/1999 |
| WO | 2004/048086 A2 | 6/2004 |

OTHER PUBLICATIONS

International Preliminary Report on Patentability for corresponding International Application No. PCT/US2010/042216 mailed Oct. 14, 2011.

* cited by examiner

FIRE RESISTANT HOSE ASSEMBLY

RELATED APPLICATIONS

This application is a national phase of International Application No. PCT/US2010/042216 filed Jul. 16, 2010 and published in the English language, which claims priority to U.S. 61/228,281 filed Jul. 24, 2009.

FIELD

The present invention relates to hose assemblies, and more particularly to a fire resistant hose assembly which may find particular use in aerospace applications.

BACKGROUND

Hose systems, particularly fuel, lubricating and hydraulic hose, such as those used within aircraft engine compartments, often require fire resistant protection to minimize the likelihood of fire or high temperatures damaging the flexible elastomeric hose of the hydraulic circuits. Fire resistance is a term given its normal meaning in the art as capable of providing protection for a hose subjected to a fire for a specified period of time. Typically, resistance to fire and high temperature is achieved by encompassing the hose and portions of the associated hose fittings with a protective firesleeve.

The firesleeve material may be wound upon reels, and the firesleeve is cut to the desired length to accommodate the length of hose with which it is to be used. The firesleeve is typically a tube and is fit over the hose by threading one end of the hose into one end of the firesleeve and pulling the firesleeve over the hose. This may be a time consuming and difficult process, especially with longer lengths of hose. Lubrication and expander devices are typically required to assist in the process. Once the hose is inserted into the firesleeve, the hose may be able to rotate or axially move within the firesleeve as there is not direct connection between the firesleeve and the hose. Movement of the firesleeve may expose the hose to high temperatures or fire.

SUMMARY

The present invention is directed to flexible hose assemblies, and particularly to a light weight fire resistant hose assembly. Such hose assembly may find particular use in aerospace applications such as for fuel, lubrication, or hydraulic lines.

In an illustrative embodiment, the fire resistant hose includes a tubular core having an exterior surface; a reinforcement layer surrounding the exterior surface of the tubular core, the reinforcement layer including one or more filaments of one or more fibers; a thermal insulation layer surrounding reinforcement layer, the thermal insulation layer including one or more filaments of e-glass; and an integral firesleeve layer surrounding the thermal insulation layer.

The integral firesleeve layer may be constructed of an ablative polymeric material. The ablative polymeric material of the firesleeve layer may be chosen from cross-linked silicone resins and copolymers, and combinations thereof. In one embodiment, the total thickness of the integral firesleeve is between about 0.10-0.15 inch (0.25-0.38 mm).

The tubular core may include a polymeric material chosen from fluoropolymer resins and copolymers, and combinations thereof.

The reinforcement layer may be braided, wound, woven, or knitted of one or more filaments of one of more fibers. In one embodiment, the fibers of the reinforcement layer are aramid fibers. A polytetrafluoroethylene barrier layer may surround the aramid reinforcement layer.

The thermal insulation layer may be braided, wound, woven, or knitted of the one or more filaments of e-glass fibers.

A conductor wire may be interposed between the insulation layer and the integral fire sleeve layer.

In one aspect of the invention, there is provided a high pressure, fire resistant hose assembly that includes the hose and at least one end fitting. The end fitting includes a tubular nipple portion configures for insertion into the end of the hose; a socket having a crimp portion surrounding at least a portion of the tubular nipple portion and crimping the end of the hose; and a fire cuff for holding the socket in a crimped position on the hose. In one embodiment, the fire cuff is constructed of a material is chosen from cross-linked silicone resins and copolymers, and combinations thereof.

The foregoing and other features of the invention are hereinafter described in greater detail in accordance with reference to the accompanying drawings.

DETAILED DESCRIPTION

Although applicable to a wide variety of systems, the principles of the present invention have particular application to fluid systems in which flexible hose are used, such as the aerospace, automotive and plumbing industries.

Figure 1:
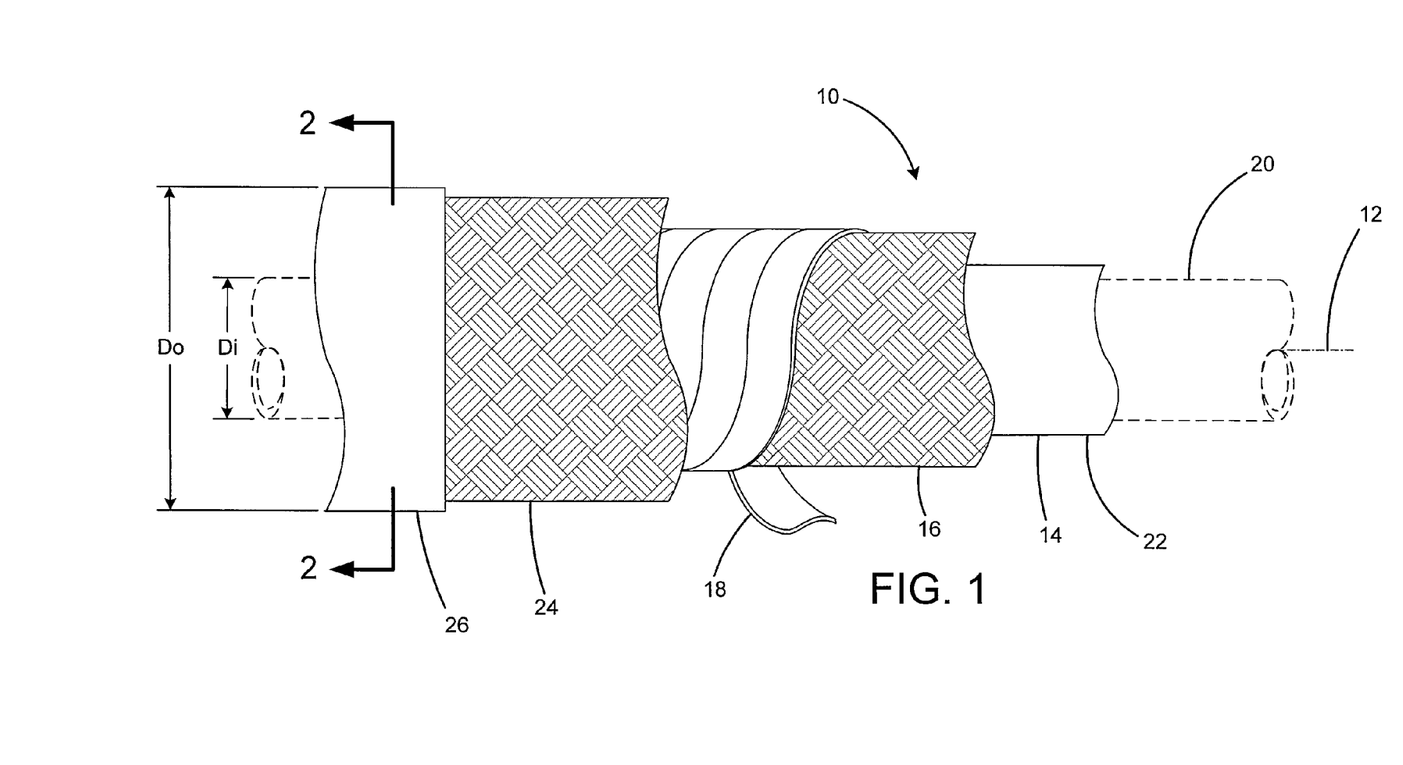
FIG. 1 is a side view, broken away in successive structural layers, of a hose made in accordance with the present invention.
Figure 2:
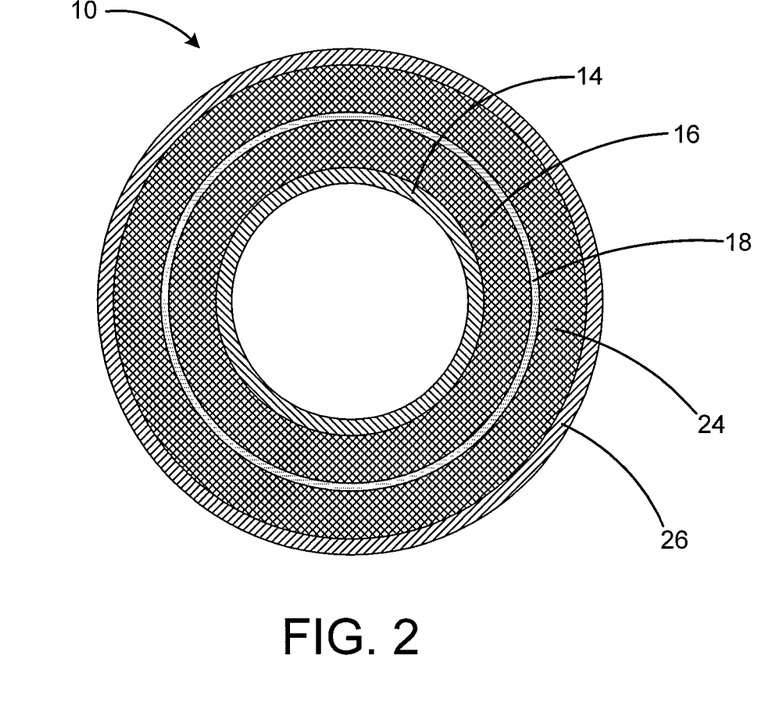
FIG. 2 is a radial cross section take along line 2-2 of FIG. 1.

Referring initially to FIGS. 1 and 2, an exemplary embodiment of a fire resistant flexible reinforced hose assembly 10 is shown. In basic dimensions, hose assembly 10 extends axially to an indefinite length along a central longitudinal axis, 12, and in a radial direction circumferentially about axis 12 in defining a select inner and outer diameter referenced, respectively, at "$D_i$" and "$D_o$". The inner and outer diameter dimensions may vary depending upon, for example, the pressure rating for the intended application, but generally may be between about 0.1-1.5 inch (0.254-3.81 cm) for inner diameter $D_i$, and between about 0.35-2.5 inch (0.889-6.35 cm) for outer diameter $D_o$, for an overall wall thickness therebetween of between about 0.125-0.5 inch (0.318-1.27 cm).

As may be seen in FIG. 1, hose 10 is constructed as being formed about a tubular core 14. Core tube 14 may itself have an inner diameter of between about 0.1-1.5 inch (0.254-3.81 cm), and an outer diameter of between about 0.150-1.7 inch (0.381-4.32 cm) for a wall thickness therebetween of between about 0.025-0.1 inch (0.06-0.254 cm). However, and as with the overall dimensions of hose construction 10, the dimensions of the core tube 14 may vary with the particular application involved. Typically, the core tube 14 may be generally round in cross-section as shown, but alternatively may be of an elliptical, polygonal, or other geometric shape.

Core tube 14 may be provided as extruded, molded, or otherwise formed of a plastic or other polymeric resin which typically may be a thermoplastic. Suitable materials, along with copolymers and blends, mixtures, alloys, or other combinations thereof, include polyesters, polyvinyl chlorides, polyimides, polyurethanes, poly(ether ether ketone), polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, polyolefins such as high density or molecular weight polyethylene and polyamides such as Nylon 12, and fluoropolymers, but as may be specifically selected for high or low temperature resistance, surface characteristics such as coefficient of friction, physical or mechanical properties such as flexural modulus, or, in the case of fluid transfer, chemical compatibility with the fluid being handled. Indeed, for many aerospace applications or other applications calling for chemical resistance, a fluoropolymer may be specified. Representative fluoropolymers include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), and copolymers and blends and other combination thereof. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine. The material forming the core tube 14 may be a homo or copolymer, or a combination thereof such as a blend of one or more homopolymers, one or more copolymers, or one or more homopolymers and one or more copolymers. Such materials each additionally may be admixed with other resins, which may be thermoplastic or thermosetting, such as to form an alloy, blend, mixture, or other combination, or a copolymer thereof.

Alternatively, core tube 14 may be formed of a resin which is a thermoplastic, i.e., melt-processable, synthetic rubber such as a chlorosulfonate, polybutadiene, butyl, neoprene, nitrile, polyisoprene, or buna-N, a copolymer rubber such as ethylene-propylene (EPR), ethylene-propylene-diene monomer (EPDM), nitrile-butadiene (NBR) or styrene-butadiene (SBR), or a blend such as ethylene or propylene-EPDM, EPR, or NBR, or a copolymer or blend of any of the foregoing. The term "synthetic rubbers" also should be understood to encompass materials which alternatively may be classified broadly as thermoplastic elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

The material forming core tube 14 may be compounded with one or more other fillers, and/or with modifiers or other additives. Such additives, which may be functional or inert, may be provided to be in liquid, powder, particulate, flake, fiber, or other form, and may include other electrically-conductive fillers, microwave-attenuating fillers, thermally-conductive fillers, lubricants such as molybdenum disulfide ($MOS_2$), wetting agents, surfactants, stabilizers, antioxidants, dispersants, pigments, dyes, and other colorants, colorings, or opacifying agents such as for coloring-coding of the tubing, luminescents, light reflectants, anti-static agents, coupling agents such as titanates, chain extending oils, tackifiers, flow modifiers, blowing agents, foaming or anti-foaming agents, reinforcements such as glass, carbon, or textile fibers, silanes, peroxides, film-reinforcing polymers and other agents, emulsifiers, thickeners, and/or flame retardants and other fillers such as aluminum trihydrate, antimony trioxide, metal oxides and salts, intercalated graphite particles, phosphate esters, decabromodiphenyl oxide, borates, siloxanes, phosphates, halogenated compounds, glass, silica, which may be fumed or crystalline, silicates, mica, ceramics, and glass or polymeric microspheres. Typically, the additives are blended or otherwise admixed with the base material, and may comprise between about 0.05% and 80% or more by total volume of the formulation.

In one embodiment, core tube 14 is constructed of an electrically-conductive material, such as for static dissipation and/or electrical grounding. The resin forming the tube 14 thus may be filled with a carbon black or other electrically-conductive filler. As admixed with the black, the resin generally may form a binder into which the black filler may be dispersed. The black filler generally may be included within the resin in a proportion sufficient to provide the level of electrical conductivity which is desired for the intended application.

Core tube 14 also may be provided as having a multi-layer, i.e., two or more layer, laminate construction. Such laminate construction may include at least a first layer, which is shown in phantom at 20 to be the innermost layer, and a second layer, which is shown to be the outermost layer and is commonly referenced at 22 with the tube 14. In the illustrative embodiment of hose 10 depicted in FIG. 1, the second layer 22 may be concentric with and integrally adjoining the first layer 20. In alternative constructions, the layers 20 and 22 also may be reversed such that layer 20 forms the outermost layer and layer 22 forms the innermost layer. Additional layers also may be provided between the layers 20 and 22, and/or as surrounding or being surrounded by the layers 20 and 22.

The wall thicknesses of each of the layers 20 and 22, and of any other layers forming the core tube 14, may be of any thickness, both absolute and relative to the thickness of the other layers. For many applications, however, and as may be irrespective of which of the layers 20 and 22 is the innermost layer and which is the outermost layer, the first layer 20 may function as a liner as being relatively thin and formed of a fluoropolymer or other chemically resistant material, which as before may be filled or unfilled, with second layer 22 functioning as a support or backing as being relatively thick and formed of a less expensive, but stronger, more general purpose resin such as a polyamide, which also may be filled or unfilled. For cost and performance considerations, the wall thickness of the second layer 22 may comprise between about 70-80% of the overall thickness of the layers 20 and 22, with the wall thickness of the first layer 20 comprising between about 20-30% of such overall thickness, i.e., the wall thickness of the second layer 22 being about 1-10 times thicker than the thickness of the first layer 20.

To the extent formed of compatible resin materials, the layers 20 and 22 layers may be extruded, such as by being co-extruded or sequentially extruded, or otherwise formed as being cross-linked together or otherwise chemically or fusion bonded together directly at their interface into an integral, tubular composite, i.e., laminate structure. Alternatively, if formed of dissimilar or otherwise incompatible resin materials, an adhesion-promoting surface treatment may be applied between the interfacing surfaces thereof the layers 20 and 22. Alternatively, one or more intermediate tie or bonding layers may be co-extruded or otherwise interposed between the layers 20 and 22 as being formed of a material which is adhesion or fusion bond, or otherwise co-compatible with both the materials of layers 20 and 22. The wall thicknesses of such intermediate layer or layers typically will be less than or about equal to the wall thickness of the other layers. The use of tie layers is further described in U.S. Pat. Nos. 3,561,493; 5,076,329; 5,167,259; 5,284,184; 5,383,087; 5,419,374; 5,460,771; 5,469,892; 5,500,257; 5,554,425; 5,566,720; 5,622,210; 5,678,611; 5,743,304; 6,390,141; 6,742,545; 6,807,988; 6,776,195; and in publication US 2004/0134555, the disclosures of which are incorporated herein by reference.

With continuing reference to the illustrative assembly of hose 10 depicted in FIG. 1, a light weight reinforcement layer 16, may be provided as knitted, braided, woven, spiral, i.e., helically, or otherwise wound, and/or wrapped or otherwise formed to surround the tube core 14. The reinforcement layer 16 may be formed of one or more filaments, which may be monofilaments, continuous multi-filament, i.e., yarn, stranded, cord, roving, thread, braid, tape, or ply, or short "staple" strands, of one or more fiber materials. The fiber material may be a blend, alloy, or other combination of two or more different materials. Suitable polymeric materials from which the reinforcement layer may be constructed include nylon, polyester, polyamide, aramid, polyolefin, polyvinyl alcohol (PVA), polyvinyl acetate, or polyphenylene bezo-bisoxazole (PBO), or blend or other combination thereof. Examples of suitable aramids include NOMEX® (poly(m-phenylene terephthalamide) and KEVLAR® (aromatic polyamide), which are both available from DuPont. An example of a suitable nylon is CORDURA® nylon 6-6 available from Invista. The reinforcing layer 16 may or may not be adhesively bonded to the core tube 14.

In a preferred embodiment, the reinforcement layer 16 is constructed of braided KEVLAR®. The KEVLAR® yarn used may be, for example, 1500 denier or 3000 denier. The KEVLAR® has a modulus of elasticity of between 400 and 500 grams per denier, a tenacity of more than 15 grams per denier at room temperature, and an elongation at break of about 4%. Its density is between 1.40 and 1.50 and it has a tensile strength of about 405,000 psi. The KEVLAR® reinforcing layer 16 although illustrated in braided form, alternatively may be spirally wound, or knitted. When in the form of a braid or spirally wound, it may be applied to the core tube 14 under tension at a pitch angle of between about 48° and 63°. The tension and area coverage at which the reinforcement layer 16 is braided, wound or knitted may be varied to achieve the desired flexibility, which may be measured by bend radius, flexural forces, or the like, of the hose 10.

Hose assembly 10 includes a barrier layer 18 adjacent the reinforcing layer 16. The KEVLAR® braid of the reinforcing layer 16 may lose its strength if it encounters either oil or other similar contaminants. Therefore, to protect the KEVLAR® braid from an outside attack by oil or any other environmental contaminant, a relatively thin "Teflon" or PTFE tape 18 is wound or wrapped around the KEVLAR® reinforcing layer 16. The tape 18 can be helically wrapped, with 10% to 75% overlap with approximately a 50% overlap preferred, along the axis of the hose. Alternatively, it can be axially wrapped longitudinally, with an overlap in the order of 10% to 100%, with approximately 50% preferred. In some cases, both helical and axial wrap may be used. Greater overlaps can also be used, but they are not usually necessary. The thickness of the tape can be in the order 0.001 to 0.015 inches. The material selected for any given hose assembly can vary based on the fluids and temperature which are to be encountered. While the tape wrap is preferred for general purpose use, it is possible that, for specific fluids such as lube oil or gasoline, a less expensive plastic such as nylon or high-density polyethylene or the like would be suitable instead of PTFE.

The hose assembly 10 includes at least one thermal insulation layer 24, which is provided to surround the core tube 14 and reinforcement layer 16 for thermally insulating or otherwise protecting the core tube 14 and reinforcement layer 16 in the event of a fire situation, and thereby assisting in maintaining the core tube 14 and reinforcement layer 16 at temperature below the combustion temperatures thereof. The thermal insulation layer 24 may be formed from one or more layers of a suitable material, which may be provided in the form of a tape or other film which may be spiral, i.e., helically, wrapped in an overlapping manner over the surface of the barrier layer 18 or over any intermediate layers which may be interposed therebetween.

The thermal insulation layer 24 may have a thickness of between about 5-10 mils (0.127-0.254 mm). However, as the degree of fire resistance provided in the hose 10 by the insulation layer 24 will be generally proportional to the thicknesses of that layer, it should be understood that a thicker layer or multiple thinner layers can be provided in the construction to increase the fire resistance thereof.

The insulating layer 24 may be any suitable material for providing thermal insulation to the underlying hose structure, i.e., the core tube or the core tube in combination with one or more reinforcing layers. In one embodiment, the insulating layer may be a fibrous material comprising a material chosen from silica fibers, fiberglass, ceramic fibers, and the like. The fibrous material may be provided as a strip or tape that is wound about the reinforcement layer overlying the core tube. Where multiple insulating layers are employed, the layers may be formed from the same or different materials. When the insulating layer comprises two or more layers, the layers may be the same or different in terms of thickness and/or the materials used in the respective layers. Non-limiting examples of material suitable for the insulating layer include a silica fiber tape available from Insulflex AB or fiberglass yarn available from AGY.

In a preferred embodiment, the insulating layer 24 is constructed of braided fiberglass, known as e-glass. Examples of useful braided e-glass include those listed in Table 1 below.

TABLE 1

| Product Name | Sizing | Bare Glass Yield | | | | | | Minimum Tensile (Lbs/Nt) |
| --- | --- | --- | --- | --- | --- | --- | --- | --- |
| | | Nominal Yds/lb | Minimum Yds/lb | Maximum Yds/lb | Nominal Tex | Maximum Tex | Minimum Tex | |
| ETG 1.75 ET9-2835 | None | 162 | 150 | 174 | 3062 | 3307 | 2851 | 50/222.5 |
| ETG 1.75 ET9-2835 | Acrylic | 161 | 148 | 174 | 3081 | 3352 | 2851 | 50/222.5 |

The thickness of the insulating layer(s) may be selected as desired to provide a desired level of thermal insulation to the underlying core tube and reinforcing layer. That is, the thickness may be selected such that the temperature of the core tube's outer surface does not exceed a desired threshold limit over a given period of time. In one embodiment, the insulating layer has a thickness that is about 30 to about 70% of the overall radius of the hose assembly. In one embodiment, the insulating layer may have a thickness in the radial dimension of from about 0.1 to about 0.3 inches. The number of insulating layers may be selected as desired to provide a particular level of thermal insulation as well as maintain other desirable properties for the hose including, for example, a desired level of flexibility.

The insulating layer 24 may be sheathed within one or more layers of a coaxially-surrounding protective firesleeve, or other cover or jacket 26. Depending upon its construction, firesleeve 26 may be integrally formed as spray-applied, dip coated, cross-head or co-extruded, or otherwise conventionally extruded, spiral or longitudinally, i.e., "cigarette," wrapped, or braided over the insulating layer 24, or otherwise separately formed and sheathed thereover. Firesleeve 26 may formed of an ablative polymeric material, such as a cross-linked silicone resin, which may be a homopolymer or copolymer, or a blend, alloy, mixture, or other combination thereof. For example, a cross-linked silicone resin may be blended or otherwise compounded with a harder material, such as a thermoplastic polyurethane resin or the like, to provide increased abrasion resistance. The silicone resin or blend or other material forming the firesleeve 26 may be unfilled or filled with one or more fillers or additives such as a glass, fiberglass, mica, ceramic, or metal particulates.

By extruding the firesleeve 26 directly onto the e-glass of the insulating layer 24, a mechanical bond is formed between the e-glass fibers and molten silicone composition of the firesleeve.

In one embodiment, the insulating layer 24 is treated to improve adhesion to the overlying, extruded firesleeve 26. For example, acrylic sizing may be applied to the E-glass braid to improve the adhesion of the extruded silicone firesleeve to the insulating layer. In another embodiment, an adhesive, such as the CHEMLOK® rubber-to-substrate adhesives available from Lord Corporation, may be applied to the insulting layer to improve adhesion of the firesleeve 26 to the insulating layer 24.

The firesleeve 26 may have a thickness of between about 0.05-0.2 inch (0.13-0.51 mm) and may be formed of one or more layers, each of the layers having a thickness, independently, of between about 0.01-0.15 inch (0.03-0.38 mm). In one embodiment, the total thickness of the firesleeve 26 is between about 0.10-0.15 inch (0.25-0.38 mm). If formed of chemically compatible materials, the respective layers may be fusion bonded together at their interface. Alternatively, if formed of chemically incompatible materials, the respective layers may be bonded together with an adhesive or by means of a surface treatment or tie layer (not shown) interposed therebetween, such as in the manner described hereinbefore in connection with the layers tube layers 20 and 22.

In one embodiment, the insulating layer 24 is covered with an integral firesleeve 26 formed of a 0.130 inch (0.325 mm) layer of a cross-linked silicone resin (STI 20042-T BRNX, Dow Corning, Midland, Mich.).

The integral firesleeve 26 and underlying thermal insulation (e-glass) layer 24 combination enables the hose assembly to be light weight and less bulky than conventional fire resistant hose assemblies.

Figure 3:
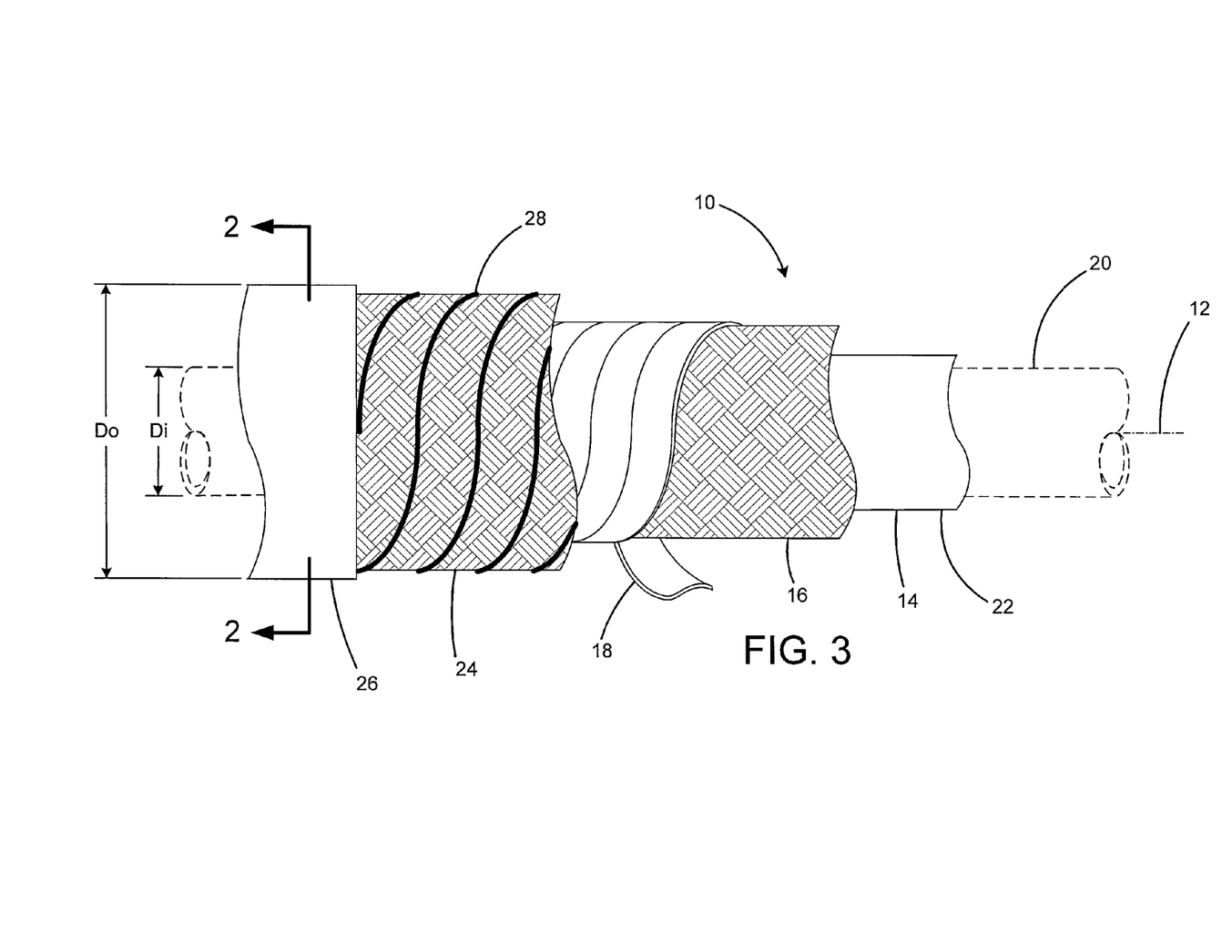
FIG. 3 is a side view, broken away in successive structural layers, of a hose including a conductor wire.

Referring to FIG. 3, the hose assembly 10 may further include a conductor wire 28 interposed between the thermal insulating layer 24 and the firesleeve 26. The conductor wire 28 may be wound around the thermal insulating layer 24 so as to render the hose electrically-conductive for static dissipation or other applications.

Figure 4:
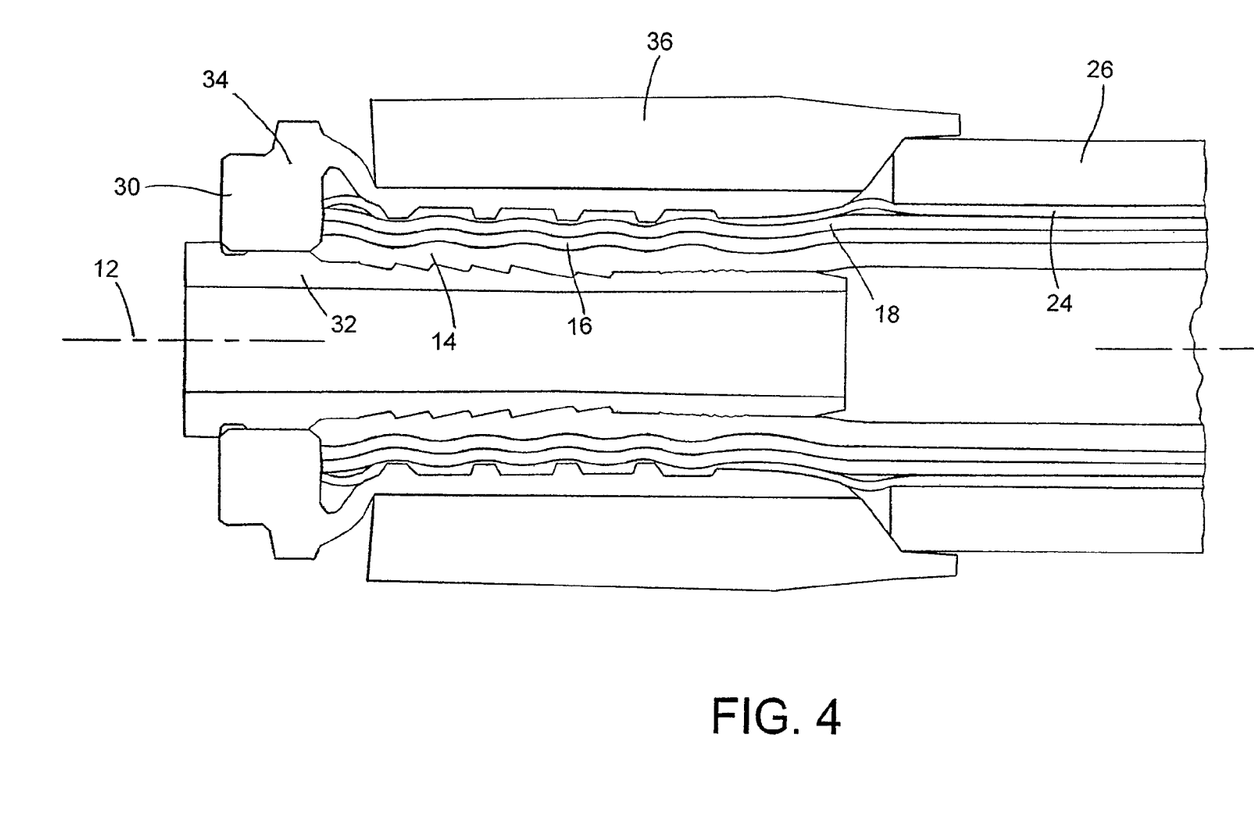
FIG. 4 is a longitudinal cross section of a hose and end fitting in accordance with an embodiment of the present invention.

It will be appreciated that the hose assembly 10 may have a fitting attached to each end for making appropriate connections as desired for a particular purpose or intended use. In FIG. 4, for example, the hose assembly of FIG. 1 is shown as having a hose fitting 30, including a nipple 32 positioned within the core tube 14, and a socket 34, and a cuff 36 overlying the socket 34 on an outer end of the hose 10. Cuff 36 may be formed of the same material as the firesleeve 26.

When using the hose assembly 10 with a fitting 30, which may typically be made of steel, the fitting 30 provides a conductive path for the heat around the fire sleeve to the interface of the fitting 30 and the hose 10, which is typically made of PTFE. A fire produces a great amount of thermal energy that can subject the materials contacting the fitting 30 to material damage. A thermal coating may be applied to the exterior surface of the nipple 32 to protect the interior of the core tube 14 and accordingly extend the life of the hose 10 in a fire environment. An example of a suitable high-temperature protective coating is CP 4010 provided by Aremco Products, Inc. of Valley Cottage, N.Y. under the trademark Corr-Paint. This protective coating is a silicone-based, heat resistant coating that is VOC-compliant, water dispersible silicone resin. This coating provides adherence to metals and provides thermal resistance to temperatures to 1100° F. (593° C.) when applied at a wet film thickness of five mils or a corresponding dry film thickness of 1.5 mils. Other thermal coatings may also be appropriate.

A hose in accordance with the present invention may be fire resistant and/or fireproof as defined by SAE AS1055 for the particular hose material. AS1055 classifies fire protection as fire resistant (Class A) where the hose withstands the designated fire test for 5 minutes without evidence of leakage, and as fireproof (Class B) where the hose withstands the designated fire test for 15 minutes without evidence of leakage. Fire protection is also classified based on the composition of the core tube (e.g., whether the core tube is rubber based or Teflon (PTFE) based), hose function (e.g., fuel and lube oil or hydraulic fluid), and compatibility (e.g., synthetic fluid or petroleum based fluid). The flow conditions under which a hose may be considered fire resistant or fireproof may be selected as desired for a particular purpose or intended use. For example, the amount of flow within the hose may affect the ability of a hose to withstand the flame in a fire test for a given period. Engines and other environments in which the hose may be used are being designed so that the fluid flow through the hose may be stopped during a fire. Thus, in one embodiment it may be desirable for the hose to be fire resistant or fireproof under zero flow conditions.

The hose assembly as described herein allows a lightweight hose (type 3154 (AS1975: high pressure, 28000 KPa) or type 3158 (AS5951: ultra-high pressure, 35000 KPa) to be equipped with an integral, silicone firesleeve. This allows for the use of a light weight hose to be installed in the hydraulic system that is located within the fire zone of an aircraft engine.

The benefit is the weight savings, without performance loss, by using a KEVLAR® reinforced hose assembly as compared with a CRES reinforced hose assembly. The benefit is fuel savings.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fire resistant hose comprising:
a tubular core having an exterior surface;
a reinforcement layer surrounding the exterior surface of the tubular core, the reinforcement layer comprising a braided, wound, woven, or knitted layer of one or more filaments of one or more aramid fibers;
a thermal insulation layer surrounding reinforcement layer, the thermal insulation layer comprising a braided, wound, woven, or knitted layer of one or more filaments of e-glass; and
an integral firesleeve layer surrounding the thermal insulation layer.

2. The hose of claim 1 wherein the firesleeve layer comprises an ablative polymeric material.

3. The hose of claim 2 wherein the ablative polymeric material of the firesleeve layer is chosen from cross-linked silicone resins and copolymers, and combinations thereof.

4. The hose of claim 1 wherein the tubular core comprises a polymeric material chosen from fluoropolymer resins and copolymers, and combinations thereof.

5. The hose of claim 1 further comprising a polytetrafluoroethylene barrier layer surrounding the reinforcement layer.

6. The hose of claim 1 further comprising a conductor wire interposed between the insulation layer and the integral firesleeve layer.

7. The hose of claim 1 wherein the total thickness of the integral firesleeve is between about 0.10-0.15 inch (0.25-0.38 mm).

8. A high pressure, fire resistant hose assembly comprising the hose of claim 1, and at least one end fitting, the end fitting comprising:
a tubular nipple portion configures for insertion into the end of the hose;
a socket having a crimp portion surrounding at least a portion of the tubular nipple portion and crimping the end of the hose; and
a fire cuff for holding the socket in a crimped position on the hose.

9. The hose assembly of claim 8 wherein the fire cuff is constructed of a material is chosen from cross-linked silicone resins and copolymers, and combinations thereof.

10. A fire resistant hose comprising:
a tubular core having an exterior surface;
a reinforcement layer surrounding the exterior surface of the tubular core, the reinforcement layer comprising a braided, wound, woven, or knitted layer of one or more filaments of one or more aramid fibers;
a thermal insulation layer surrounding reinforcement layer; and
an integral firesleeve layer surrounding the thermal insulation layer.

11. The fire resistant hose of claim 10 wherein the thermal insulation layer comprises fiberglass, ceramic fibers or silica fibers.

12. The hose of claim 10 wherein the firesleeve layer comprises an ablative polymeric material.

13. The hose of claim 12 wherein the ablative polymeric material of the firesleeve layer is chosen from cross-linked silicone resins and copolymers, and combinations thereof.

14. The hose of claim 10 wherein the tubular core comprises a polymeric material chosen from fluoropolymer resins and copolymers, and combinations thereof.

15. The hose of claim 10 further comprising a polytetrafluoroethylene barrier layer surrounding the reinforcement layer.

16. The hose of claim 10 further comprising a conductor wire interposed between the insulation layer and the integral firesleeve layer.

17. The hose of claim 10 wherein the total thickness of the integral firesleeve is between about 0.10-0.15 inch (0.25-0.38 mm).

18. A high pressure, fire resistant hose assembly comprising the hose of claim 10, and at least one end fitting, the end fitting comprising:
a tubular nipple portion configures for insertion into the end of the hose;
a socket having a crimp portion surrounding at least a portion of the tubular nipple portion and crimping the end of the hose; and
a fire cuff for holding the socket in a crimped position on the hose.

19. The hose assembly of claim 18 wherein the fire cuff is constructed of a material is chosen from cross-linked silicone resins and copolymers, and combinations thereof.

* * * * *